United States Patent
Jiang et al.

(10) Patent No.: US 12,149,925 B2
(45) Date of Patent: Nov. 19, 2024

(54) COMMUNICATION METHOD AND DEVICE

(71) Applicant: VIVO MOBILE COMMUNICATION CO., LTD., Guangdong (CN)

(72) Inventors: Dajie Jiang, Chang'an Dongguan (CN); Fei Qin, Chang'an Dongguan (CN); Yuan Zhang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 220 days.

(21) Appl. No.: 17/175,414

(22) Filed: Feb. 12, 2021

(65) Prior Publication Data

US 2021/0168676 A1  Jun. 3, 2021

Related U.S. Application Data

(63) Continuation of application No. PCT/CN2019/099927, filed on Aug. 9, 2019.

(30) Foreign Application Priority Data

Aug. 16, 2018 (CN) .......................... 201810937248.9

(51) Int. Cl.
*H04W 76/28* (2018.01)
*H04W 72/12* (2023.01)
*H04W 88/06* (2009.01)

(52) U.S. Cl.
CPC ........ *H04W 76/28* (2018.02); *H04W 72/1215* (2013.01); *H04W 88/06* (2013.01)

(58) Field of Classification Search
CPC . H04W 36/0083; H04W 36/30; H04W 76/28; H04W 72/1215; H04W 88/06;
(Continued)

(56) References Cited

U.S. PATENT DOCUMENTS 9,374,798 B2 * 6/2016 Edge ..................... H04W 64/00
2008/0032695 A1 * 2/2008 Zhu ..................... H04L 65/1095
455/442

(Continued)

FOREIGN PATENT DOCUMENTS

CN          101743769 A    *  6/2010     ........ H04W 36/0016
CN          101990319 A       3/2011
(Continued)

OTHER PUBLICATIONS

European Search Report issued in corresponding application No. 19850470.6, dated Mar. 1, 2022.
(Continued)

*Primary Examiner* — Charles N Appiah
*Assistant Examiner* — Frank E Donado
(74) *Attorney, Agent, or Firm* — Price Heneveld LLP

(57) ABSTRACT

Provided in the present disclosure are a communication method and device. The method comprises: sending discontinuous reception (DRX)-related information of a second network device to a first network device; receiving a time interval configured by the first network device, wherein the time interval is obtained by the first network device according to the DRX-related information of the second network device; and carrying out an operation for the second network device according to the time interval, wherein the first network device serves a first type network of a first operator, and the second network device serves a first type network of a second operator.

12 Claims, 7 Drawing Sheets

(58) Field of Classification Search
CPC ... H04W 48/18; H04W 8/183; H04W 60/005; H04W 76/16; H04W 76/27; H04W 76/40; H04W 36/0085
USPC .......................................................... 455/43
See application file for complete search history.

(56) References Cited

U.S. PATENT DOCUMENTS

| | | | |
|---|---|---|---|
| 2011/0280221 | A1 | 11/2011 | Chin et al. |
| 2013/0303203 | A1 | 11/2013 | Wang et al. |
| 2013/0329639 | A1 | 12/2013 | Wietfeldt et al. |
| 2014/0342700 | A1* | 11/2014 | Srinivasan ............ H04W 36/18 455/411 |
| 2015/0085684 | A1 | 3/2015 | Sadek |
| 2015/0098445 | A1 | 4/2015 | Chakravarthy et al. |
| 2015/0257099 | A1 | 9/2015 | Su |
| 2015/0373579 | A1* | 12/2015 | Xu .................... H04W 28/0289 370/230 |
| 2016/0105815 | A1* | 4/2016 | Sugahara .............. H04W 24/02 370/252 |
| 2016/0316378 | A1 | 10/2016 | Su et al. |
| 2017/0048773 | A1* | 2/2017 | Miao ................... H04B 1/3816 |
| 2017/0325115 | A1* | 11/2017 | Matsumoto ....... H04W 36/0058 |

FOREIGN PATENT DOCUMENTS

| | | |
|---|---|---|
| CN | 102388662 A | 3/2012 |
| CN | 103379468 A | 10/2013 |
| CN | 104902549 A | 9/2015 |
| CN | 105580409 A | 5/2016 |
| CN | 106658629 A | 5/2017 |
| CN | 106792787 A | 5/2017 |
| CN | 107172695 A | 9/2017 |
| EP | 2 712 235 A2 | 3/2014 |
| JP | 2015171147 A | 9/2015 |
| JP | 2017038216 A | 2/2017 |
| WO | 2013/110284 A1 | 8/2013 |

OTHER PUBLICATIONS

Korean Office Action issued in corresponding application No. 10-2021-7007676, dated Mar. 10, 2022.
EP Search Report in Application No. 19750470.6 dated Sep. 17, 2021.
"Dual-SIM Dual-Standby UEs and their impact on the RAN" 3GPP TSG-RAN WG2 #75bis, Tdco R2-115375, Ericsson, Oct. 10, 2011.
CN Office Action in Application No. 201810937248.9 dated Jun. 28, 2020.
Written Opinion and International Search Report in Application No. PCT/CN2019/099927 dated Feb. 25, 2021.
EP Search Report in Application No. 19850470.6 dated Sep. 17, 2021.
CN Office Action in Application No. 202110266823.9 Dated Dec. 19, 2022.

* cited by examiner

COMMUNICATION METHOD AND DEVICE

CROSS REFERENCE

This application is a continuation application of International Application No. PCT/CN2019/099927 filed on Aug. 9, 2019, which claims priority to Chinese Patent Application No. 201810937248.9 filed in China on Aug. 16, 2018, which is incorporated herein by reference in its entirety.

TECHNICAL FIELD

Embodiments of the present disclosure relate to the field of communications technologies, and in particular, to a communication method and a communication device.

BACKGROUND

Networks of the same type (or referred to as the same standard) in a multi-card multi-standby single-pass terminal share transceiver hardware. For example, there is only one set of transceiver hardware in a fifth-generation communications system (fifth Generation, 5G) of a dual-card dual-standby single-pass terminal, or there is only one set of transceiver hardware in a fourth-generation communications system (fourth Generation, 4G) of a dual-card dual-standby single-pass terminal.

Using the dual-card dual-standby single-pass terminal as an example, the dual-card dual-standby single-pass terminal can use the following services: A 5G network of China Mobile (Mobile for short) provides a data service, and a 5G network of China Telecom (Telecom for short) provides a voice over 5GNR (VoNR) service. Alternatively, a 4G network of China Mobile provides a data service, and a 4G network of China Telecom provides a voice over LTE (Volte) service.

Related technologies have the following problems:
(1) Because the dual-card dual-standby single-pass terminal has only one set of transceiver hardware for networks of the same type, signals cannot be transmitted or received in networks of the same type of different operators at the same time.
(2) In a process in which the dual-card dual-standby single-pass terminal receives or transmits a signal by using a specific network, when the network has very poor signal quality or high load, the dual-card dual-standby single-pass terminal may switch to another network. Because the dual-card dual-standby single-pass terminal currently can only select one subscriber identification card (for example, subscriber identification card (Subscriber Identification Module, SIM) card) to receive or transmit a signal, a user needs to perform manual setting to switch a network if another subscriber identification card is to be selected. This affects use experience.
(3) The New Radio (NR) release 15 (R15) has supported exchange of time-frequency domain information between a next generation node base station (gNB) and an evolved NodeB (eNB) in evolved universal terrestrial radio access (E-UTRA)-NR dual connectivity (EN-DC for short) to avoid self-interference of the terminal.

However, a scenario of a multi-card multi-standby single-pass terminal (even a multi-card multi-standby multi-pass terminal) is more complex than the EN-DC scenario. The multi-card multi-standby single-pass terminal (even the multi-card multi-standby multi-pass terminal) needs to be extended to exchange of time-frequency domain information between at least two systems. When it is difficult for operators of different subscriber identification cards to exchange time-frequency domain information in real time, a self-interference problem of the terminal may occur.

SUMMARY

According to a first aspect, a communication method is provided and is applied to a terminal device, where the method includes:
sending discontinuous reception DRX-related information of a second network device to a first network device;
receiving a time gap configured by the first network device, where the time gap is obtained by the first network device based on the DRX-related information of the second network device; and performing an operation for the second network device based on the time gap;
where the first network device serves a first-type network of a first operator, and the second network device serves a first-type network of a second operator.

According to a second aspect, a communication method is further provided and is applied to a first network device, where the method includes:
receiving DRX-related information of a second network device from a terminal device; and
configuring a time gap of the terminal device based on the DRX-related information of the second network device, where the time gap is used by the terminal device to perform an operation for the second network device; where
the first network device serves a first-type network of a first operator, and the second network device serves a first-type network of a second operator.

According to a third aspect, a communication method is further provided and is applied to a terminal device, where the method includes:
measuring a first-type network of a second operator when the terminal device works in a first-type network of a first operator, to obtain a measurement result; and
switching from the first-type network of the first operator to the first-type network of the second operator when the measurement result meets a predetermined switching condition.

According to a fourth aspect, a communication method is provided and is applied to a terminal device, where the method includes:
determining a first frequency band, where the first frequency band indicates a frequency band on which intra-UE interference can be generated between at least two networks;
determining a first resource based on the first frequency band, where the first resource indicates a resource that is available and/or unavailable to each of the at least two networks; and
sending related information of the first resource to a network device.

According to a fifth aspect, a communication method is provided and is applied to a network device, where the method includes:
receiving related information of a first resource from a terminal device, where the first resource indicates a resource that is available and/or unavailable to each of at least two networks, the first resource is determined by the terminal device based on a first frequency band, and the first frequency band indicates a frequency band on which intra-UE interference can be generated between the at least two networks.

According to a sixth aspect, a terminal device is further provided, and includes:

a first sending module, configured to send DRX-related information of a second network device to a first network device;

a first receiving module, configured to receive a time gap configured by the first network device, where the time gap is obtained by the first network device based on the DRX-related information of the second network device; and a processing module, configured to perform an operation for the second network device based on the time gap; where the first network device serves a first-type network of a first operator, and the second network device serves a first-type network of a second operator.

According to a seventh aspect, a first network device is further provided, and includes:

a second receiving module, configured to receive DRX-related information of a second network device from a terminal device; and a configuration module, configured to configure a time gap of the terminal device based on the DRX-related information of the second network device, where the time gap is used by the terminal device to perform an operation for the second network device; where the first network device serves a first-type network of a first operator, and the second network device serves a first-type network of a second operator.

According to an eighth aspect, a terminal device is further provided, and includes:

a measurement module, configured to measure a first-type network of a second operator when the terminal device works in a first-type network of a first operator, to obtain a measurement result; and a switching module, configured to switch from the first-type network of the first operator to the first-type network of the second operator when the measurement result meets a predetermined switching condition.

According to a ninth aspect, a terminal device is further provided, and includes:

a first determining module, configured to determine a first frequency band, where the first frequency band indicates a frequency band on which intra-UE interference can be generated between at least two networks;

a second determining module, configured to determine a first resource based on the first frequency band, where the first resource indicates a resource that is available and/or unavailable to each of the at least two networks; and a third sending module, configured to send related information of the first resource to a network device.

According to a tenth aspect, a network device is further provided, and includes:

a fourth receiving module, configured to receive related information of a first resource from a terminal device, where the first resource indicates a resource that is available and/or unavailable to one or more networks, the first resource is determined by the terminal device based on a first frequency band, and the first frequency band represents a frequency band on which self-interference is generated in the one or more networks.

According to an eleventh aspect, a terminal device is further provided, and includes a processor, a memory, and a program that is stored in the memory and that can run on the processor, and when the program is executed by the processor, steps of the communication method described above are implemented.

According to a twelfth aspect, a network device is further provided, and includes a processor, a memory, and a program that is stored in the memory and that can run on the processor, and when the program is executed by the processor, steps of the communication method described above are implemented.

According to a thirteenth aspect, a computer-readable storage medium is further provided, where the computer-readable storage medium stores a computer program, and when the computer program is executed by a processor, steps of the communication method described above are implemented.

BRIEF DESCRIPTION OF DRAWINGS

It becomes clear for a person of ordinary skill in the art to learn various other advantages and benefits by reading detailed description of the following optional implementation manners. Accompanying drawings are merely used for showing the optional implementation manners, and are not considered as a limitation on the present disclosure. In all accompanying drawings, a same reference symbol is used to indicate a same part. In the accompanying drawings.

DESCRIPTION OF EMBODIMENTS

Figure 1:
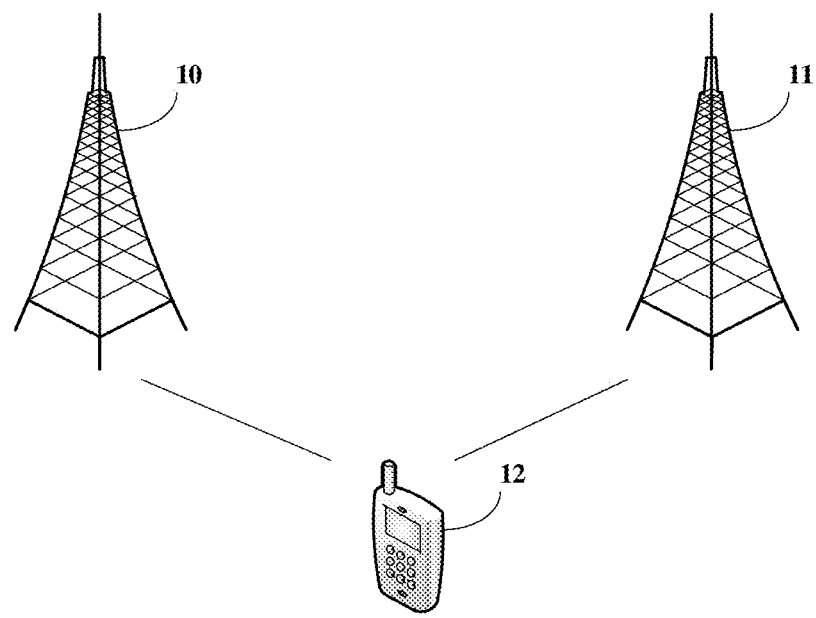
FIG. 1 is a schematic architectural diagram of a wireless communications system according to an embodiment of the present disclosure.

The following clearly describes the technical solutions in the embodiments of the present disclosure with reference to the accompanying drawings in the embodiments of the present disclosure. Apparently, the described embodiments are some but not all of the embodiments of the present disclosure. Based on the embodiments of the present disclosure, all other embodiments obtained by a person of ordinary skills in the art without creative efforts shall fall within the protection scope of the present disclosure.

The term "include" and any other variants in the specification and claims of this application are intended to cover a non-exclusive inclusion, for example, a process, a method, a system, a product, or a device that includes a list of steps or units is not necessarily limited to those expressly listed steps or units, but may include other steps or units not expressly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of the present disclosure, the word such as "exemplary" or "example" is used to represent giving an example, an illustration, or a description. Any embodiment or design scheme described as an "exemplary" or "example" in the embodiments of the present disclosure should not be explained as being more preferred or having more advantages than another embodiment or design scheme. Exactly, use of the word such as "exemplary" or "example" is intended to present a concept in a specific manner.

The technology described in the present disclosure is not limited to a Long Term Evolution (LTE) system or an LTE-advanced (LTE-A) system, and may also be used in various wireless communications systems, for example, Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system.

The terms "system" and "network" are often used interchangeably. A CDMA system may implement a radio technology such as CDMA2000 or universal terrestrial radio access (UTRA). UTRA includes wideband CDMA (WCDMA) and another CDMA variation. A TDMA system may implement a radio technology such as Global System for Mobile Communication (GSM). An OFDMA system may implement a radio technology such as Ultra Mobile Broadband (UMB), evolved UTRA (Evolution-UTRA, E-UTRA), IEEE 802.11 (Wi-Fi), IEEE 802.16 (WiMAX), IEEE 802.20, or Flash-OFDM. UTRA and E-UTRA are parts of a universal mobile telecommunications system (UTMS). LTE and advanced LTE (for example, LTE-A) are new UMTS versions that use E-UTRA. UTRA, E-UTRA, UMTS, LTE, LTE-A, and GSM are described in a document of an organization named "3rd Generation Partnership Project" (3GPP). CDMA 2000 and UMB are described in a document of an origination named "3rd Generation Partnership Project 2" (3GPP2). The technology described in the present disclosure may also be used in the foregoing system and radio technology, and may also be used in another system and radio technology.

The embodiments of the present disclosure are described below with reference to the accompanying drawings. The communication method and the communication device provided in the embodiments of the present disclosure may be applied to a wireless communications system. FIG. 1 is a schematic structural diagram of a wireless communications system according to an embodiment of the present disclosure. As shown in FIG. 1, the wireless communications system may include at least two network devices and a terminal device. The at least two network devices may include a first network device 10 and a second network device 11. The terminal device is denoted as user equipment (UE) 12. The UE 12 may communicate with (transmit signaling to or transmit data to) the first network device 10 and the second network device 11. In actual application, a connection between the foregoing devices may be a wireless connection. To conveniently and intuitively represent a connection relationship between the devices, a solid line is used for illustration in FIG. 1. It should be noted that the foregoing communications system may include a plurality of pieces of UE 12, and the first network device 10 and the second network device 11 may communicate with the plurality of pieces of UE 12.

The terminal device provided in the embodiments of the present disclosure may be a mobile phone, a tablet computer, a notebook computer, an ultra-mobile personal computer (UMPC), a netbook, a personal digital assistant (PDA), a mobile Internet device (MID), a wearable device, an in-vehicle device, or the like.

The first network device 10 and the second network device 11 provided in the embodiments of the present disclosure may be base stations, and the base station may be a generally used base station, or may be an evolved node base station (eNB), or may be a device such as a network device (for example, a next generation node base station (gNB) or a transmission and reception point (TRP)) in a 5G system.

Figure 2:
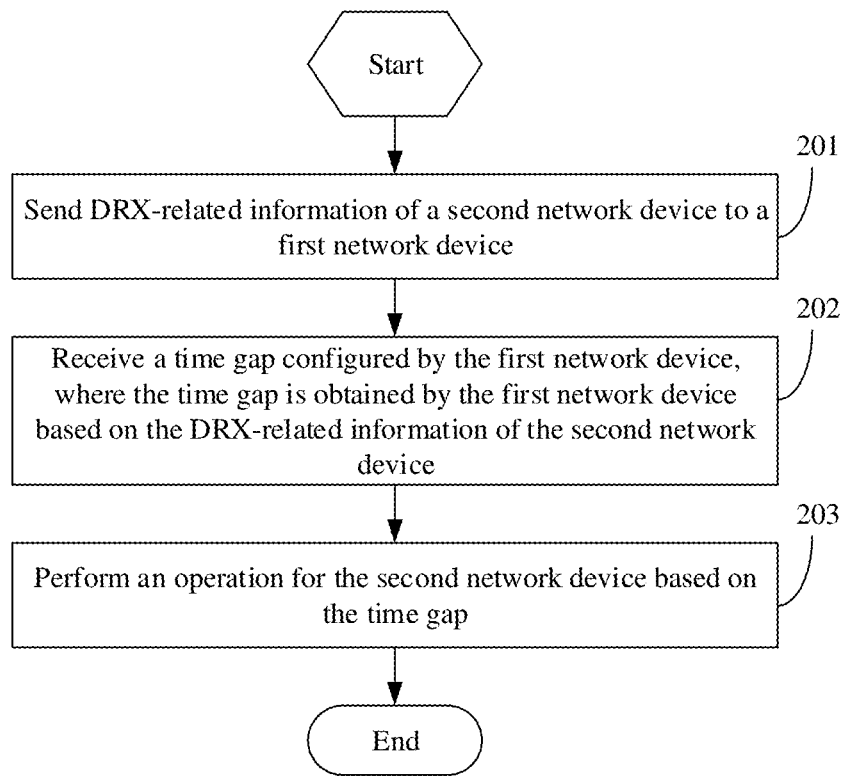
FIG. 2 is a flowchart 1 of a communication method according to an embodiment of the present disclosure.

As shown in FIG. 2, an embodiment of the present disclosure provides a communication method. The method is performed by a terminal device. For example, the terminal device is a multi-card multi-standby single-pass terminal. Certainly, this is not limited. Specific steps are as follows:

Step 201: Send DRX-related information of a second network device to a first network device.

The first network device may serve a first-type network of a first operator, and the second network device may serve a first-type network of a second operator. The first-type network may also be referred to as a first-standard network, for example, a 5G network or a 4G network. It can be understood that the first-type network is not specifically limited in this embodiment of the present disclosure.

Optionally, the first network device may be a 5G base station of China Mobile, and the second network device may be a 5G base station of China Telecom; or the first network device may be a 4G base station of China Mobile, and the second network device may be a 4G base station of China Telecom. Certainly, this is not limited.

In this embodiment of the present disclosure, optionally, in step 201, the terminal device sends the DRX-related information of the second network device to the first network device based on a predetermined time format, where the first network device supports the predetermined time format. In this way, the DRX-related information of the second network device is transparent for the first network device.

In this embodiment of the present disclosure, optionally, the DRX-related information may be at least one of the following: DRX-related information for an idle state (DRX in the idle state, I-DRX for short), DRX-related information for an inactive state, and DRX-related information for a connected state. Certainly, this is not limited.

In this embodiment of the present disclosure, optionally, content in the DRX-related information may include at least one of the following: DRX-related information of a DRX period, DRX-related information of an offset, and DRX-related information of duration. Certainly, this is not limited.

Step 202: Receive a time gap configured by the first network device, where the time gap is obtained by the first network device based on the DRX-related information of the second network device.

The time gap may also be referred to as a time gap.

In this embodiment of the present disclosure, optionally, the time gap may include at least one of the following: a DRX period, a measurement gap, and a multicast broadcast single-frequency network (MBSFN) period.

In this embodiment of the present disclosure, optionally, a DRX period of the first network device may be N times of a DRX period of the second network device; or a measurement gap of the first network device may be N times the DRX period of the second network device; or an MBSFN period of the first network device may be N times the DRX period of the second network device. N may be greater than or equal to 1. In this way, impact on the second network device can be effectively reduced.

In this embodiment of the present disclosure, optionally, before step 202, the method may further include: sending first information to the first network device, where the first information is used to represent an application scenario or an application purpose of the time gap. For example, the first information may represent a measurement scenario or a measurement purpose, or may represent an access scenario or an access purpose. It can be understood that the first information is not specifically limited in this embodiment of the present disclosure.

Step 203: Perform an operation for the second network device based on the time gap.

In step 203, optionally, the terminal device may perform the operation for the second network device based on the time gap configured by the first network device, for example, a DRX period, a measurement gap, or an MBSFN period. It can be understood that the operation for the second network device includes but is not limited to: performing initial access on the second network device, listening on a paging physical downlink control channel (PDCCH), performing radio resource management (RRM) measurement, performing cell reselection, and the like.

It should be noted that if the second network device has a voice service for the terminal device, a communication module of the terminal device may continue to work in the second network device, and the communication module of the terminal device may stop working on the first network device.

It should also be noted that a configured time tap (for example, a DRX period, a measurement gap, or an MBSFN period) needs to consider impact of radio frequency retuning time (RF retuning time) or 4G or 5G frequency band switching time of the terminal device, in other words, a sufficient time headroom is reserved.

In this embodiment of the present disclosure, the terminal device can transmit or receive a signal in networks of the same type of different operators through time division multiplexing. For example, the terminal device can receive paging of 5G VoNR of China Telecom while receiving 5G data of China Mobile.

Figure 3:
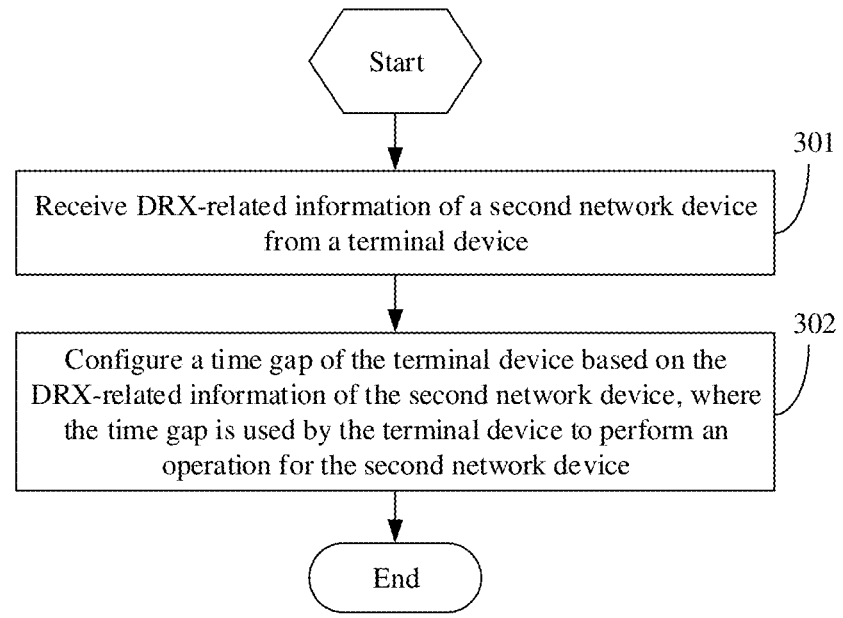
FIG. 3 is a flowchart 2 of a communication method according to an embodiment of the present disclosure.

As shown in FIG. 3, an embodiment of the present disclosure provides a communication method. The method is performed by a first network device. Specific steps are as follows:

Step 301: Receive DRX-related information of a second network device from a terminal device.

The first network device may serve a first-type network of a first operator, and the second network device may serve a first-type network of a second operator. The first-type network may also be referred to as a first-standard network, for example, a 5G network or a 4G network. It can be understood that the first-type network is not specifically limited in this embodiment of the present disclosure.

Optionally, the first network device may be a 5G base station of China Mobile, and the second network device may be a 5G base station of China Telecom; or the first network device may be a 4G base station of China Mobile, and the second network device may be a 4G base station of China Telecom. Certainly, this is not limited.

In step 301, the DRX-related information of the second network device is received from the terminal device. The DRX-related information of the second network device is a predetermined time format, and the first network device supports the predetermined time format. In this way, the DRX-related information of the second network device is transparent for the first network device.

Step 302: Configure a time gap of the terminal device based on the DRX-related information of the second network device, where the time gap is used by the terminal device to perform an operation for the second network device.

In this embodiment of the present disclosure, optionally, the DRX-related information may be at least one of the following: DRX-related information for an idle state (DRX in the idle state, I-DRX for short), DRX-related information for an inactive state, and DRX-related information for a connected state. Certainly, this is not limited. In this embodiment of the present disclosure, optionally, content in the DRX-related information may include at least one of the following: DRX-related information of a DRX period, DRX-related information of an offset, and DRX-related information of duration.

In this embodiment of the present disclosure, optionally, the time gap may include at least one of the following: a DRX period, a measurement gap, and a multicast broadcast single-frequency network (MBSFN) period.

In this embodiment of the present disclosure, optionally, a DRX period of the first network device may be N times of a DRX period of the second network device; or a measurement gap of the first network device may be N times the DRX period of the second network device; or an MBSFN period of the first network device may be N times the DRX period of the second network device. N may be greater than or equal to 1. In this way, impact on the second network device can be effectively reduced.

In this embodiment of the present disclosure, optionally, before step 302, the method further includes: receiving first information, where the first information is used to represent an application scenario or an application purpose of the time gap. For example, the first information may represent a measurement scenario or a measurement purpose, or may represent an access scenario or an access purpose. It can be understood that the first information is not specifically limited in this embodiment of the present disclosure.

In this embodiment of the present disclosure, the terminal device may perform the operation for the second network device based on the time gap configured by the first network device, for example, a DRX period, a measurement gap, or an MBSFN period. It can be understood that the operation for the second network device includes but is not limited to: performing initial access on the second network device, listening on a paging physical downlink control channel (PDCCH), performing radio resource management (RRM) measurement, performing cell reselection, and the like.

It should be noted that if the second network device has a voice service for the terminal device, a communication module of the terminal device may continue to work in the second network device, and the communication module of the terminal device may stop working on the first network device.

It should also be noted that a configured time tap (for example, a DRX period, a measurement gap, or an MBSFN period) needs to consider impact of radio frequency retuning time (RF retuning time) or 4G or 5G frequency band switching time of the terminal device, in other words, a sufficient time headroom is reserved.

In this embodiment of the present disclosure, the terminal device can transmit or receive a signal in networks of the same type of different operators through time division multiplexing. For example, the terminal device can receive paging of 5G VoNR of China Telecom while receiving 5G data of China Mobile.

Example 1

A terminal device reports DRX-related information of a system B to a system A.

The DRX-related information may be at least one of the following: DRX-related information for an idle state, DRX-related information for an inactive state, and DRX-related information for a connected state.

Content in the DRX-related information may include at least one of the following: a DRX period, an offset, and duration.

The system B may be referred to as a second network device, and the system A may be referred to as a first network device. The first network device serves a first-type network of a first operator, the second network device serves a first-type network of a second operator, and the first-type network may also be referred to as a first-standard network, for example, a 5G network or a 4G network.

Optionally, the first network device is a 5G base station of China Mobile, and the second network device is a 5G base station of China Telecom; or the first network device is a 4G base station of China Mobile, and the second network device is a 4G base station of China Telecom. Certainly, this is not limited.

Optionally, the terminal device reports, to the system A, information related to an application scenario or an application purpose of the time gap (or referred to as a gap), for example, related information used for accessing and measuring the system B.

The system A configures at least one of a corresponding DRX period, a measurement gap, and a multicast broadcast single-frequency network (MBSFN) period for the terminal device.

Optionally, a DRX period, a measurement gap, and an MBSFN period of the system A may be N times of a DRX period of the system B. In this way, impact on the system A can be reduced, but a delay of the system B may be increased.

The terminal device performs an operation for the system B in the DRX period, the measurement gap, or the MBSFN period based on configuration of the system A, for example, performs initial access, listens on a paging PDCCH, performs RRM measurement, and performs cell reselection for the system B.

It should be noted that if the system B has a voice service, the terminal device continues to work in the system B, and the terminal device stops working in the system A, in other words, voice precedes data.

It should also be noted that the reported or configured DRX period, measurement gap, or MBSFN period needs to consider impact of radio frequency retuning time (RF retuning time) or 5G frequency band switching time of the terminal device, in other words, a sufficient time headroom is reserved.

Figure 4:
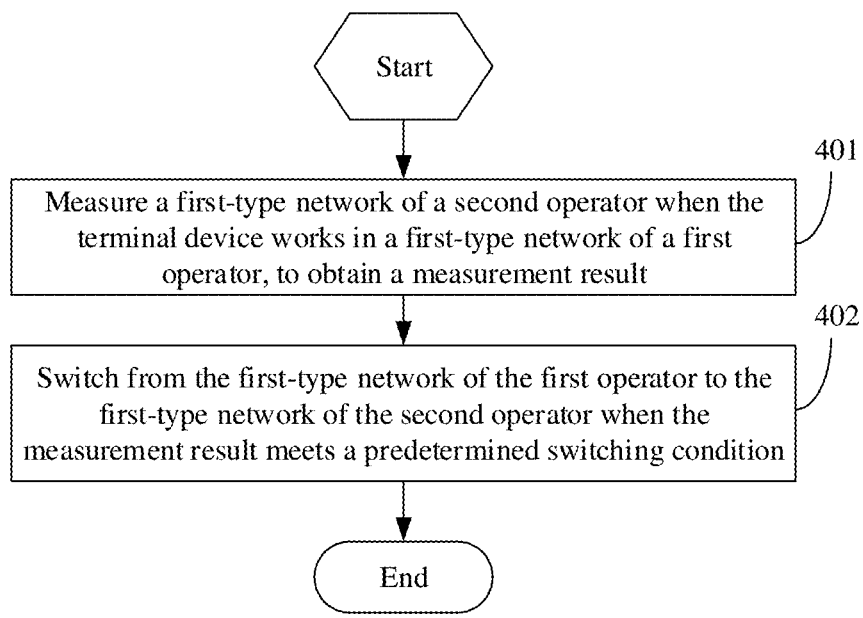
FIG. 4 is a flowchart 3 of a communication method according to an embodiment of the present disclosure.

As shown in FIG. 4, an embodiment of the present disclosure provides a communication method. The method is performed by a terminal device. For example, the terminal device may be a multi-card multi-standby single-pass terminal. Certainly, this is not limited. Specific steps are as follows:

Step 401: Measure a first-type network of a second operator when the terminal device works in a first-type network of a first operator, to obtain a measurement result.

The first-type network may also be referred to as a first-standard network, and the second-type network may also be referred to as a second-standard network.

It should be noted that the first-type network of the first operator and the first-type network of the second operator are networks of the same type of different operators. For example, the first-type network of the first operator is a 4G network of China Mobile, and the first-type network of the second operator is a 4G network of China Telecom; or the first-type network of the first operator is a 5G network of China Mobile, and the first-type network of the second operator is a 5G network of China Telecom. It can be understood that, in this embodiment of the present disclosure, an operator and a network type (or referred to as a network standard) are not specifically limited.

In this embodiment of the present disclosure, optionally, in step 401, when the terminal device works in the first-type network of the first operator, when signal quality of the first-type network of the first operator is less than a second signal threshold, the first-type network of the second operator is measured (for example, signal quality is measured and/or load is measured), to obtain a measurement result. It can be understood that a specific value of the second signal threshold is not specifically limited in this embodiment of the present disclosure. The signal quality includes Reference Signal Receiving Power (RSRP), reference signal received quality (RSRQ), received signal strength indicator (RSSI), and/or signal to interference plus noise ratio (SINR) of a signal.

In this embodiment of the present disclosure, optionally, in step 401, when the terminal device works in the first-type network of the first operator, when load of the first-type network of the first operator is less than a second load threshold, the first-type network of the second operator is measured (for example, signal quality is measured and/or load is measured), to obtain a measurement result. It can be understood that a specific value of the second load threshold is not specifically limited in this embodiment of the present disclosure.

Step 402: Switch from the first-type network of the first operator to the first-type network of the second operator when the measurement result meets a predetermined switching condition.

It can be understood that the foregoing meeting the predetermined switching condition may be that the measurement result is greater than or less than a corresponding threshold, and content of the predetermined switching condition is not specifically limited in this embodiment of the present disclosure. The measurement result may be a signal quality value or a load value of the first-type network of the second operator. Certainly, this is not limited thereto.

In this embodiment of the present disclosure, optionally, when the signal quality of the first-type network of the second operator is greater than a first signal threshold, and/or when the load of the first-type network of the second operator is less than a first load threshold, the first-type network of the first operator is switched to the first-type network of the second operator. It can be understood that specific values of the first signal threshold and the first load threshold are not specifically limited in this embodiment of the present disclosure.

In this embodiment of the present disclosure, optionally, the following step is performed before or after step 402 or at the same time with step 402: when the measurement result meets the predetermined switching condition, informing whether to switch from the first-type network of the first operator to the first-type network of the second operator.

In this embodiment of the present disclosure, optionally, the method may further include: predefining switching priorities of different types of networks of different operators.

Further, a switching priority of the first-type network of the second operator is higher than at least one of the following:
 (1) a switching priority of another type of network of the second operator;
 (2) a switching priority of a first-type network or another type of network of another operator.

For example, a switching priority of the 5G network of Chin Telecom or China Mobile is the highest.

In this embodiment of the present disclosure, multiple operator networks can be automatically switched. For example, 5G network coverage and user experience can be improved. In particular, when one 5G network has poor signal quality or high load, the terminal device can be automatically switched to another 5G network, to maintain nearly consistent experience.

Example 2

In an implementation, when the terminal device works on a 5G frequency band of China Mobile, and signal quality is very poor, the terminal device is switched to a 5G frequency band of China Telecom for initial access and measurement. If a signal condition of the 5G frequency band of China Telecom is better than a signal condition of the 5G frequency band of China Mobile, the terminal device may inform the user whether to switch a working frequency band of the terminal device to the 5G frequency band of China Telecom, or a system is switched automatically to the 5G frequency band of China Telecom.

In another implementation, when the terminal device works on a 5G frequency band of China Mobile, and network load is very high (for example, a data rate of the terminal device is very low or the data rate is 0), the terminal device is switched to a 5G frequency band of China Telecom for initial access and measurement. If a signal of the 5G frequency band of China Telecom is sufficient and the 5G frequency band of China Telecom is not overloaded, the terminal device informs the user whether to switch to the 5G frequency band of China Telecom, or the system is automatically switched to the 5G frequency band of China Telecom.

In this example, the system of the terminal device may set the following content: providing a system setting option for the terminal device, and predefining switching priorities of different types of networks of different operators, for example, a switching priority of a 5G network of China Telecom or China Mobile is the highest.

Figure 5:
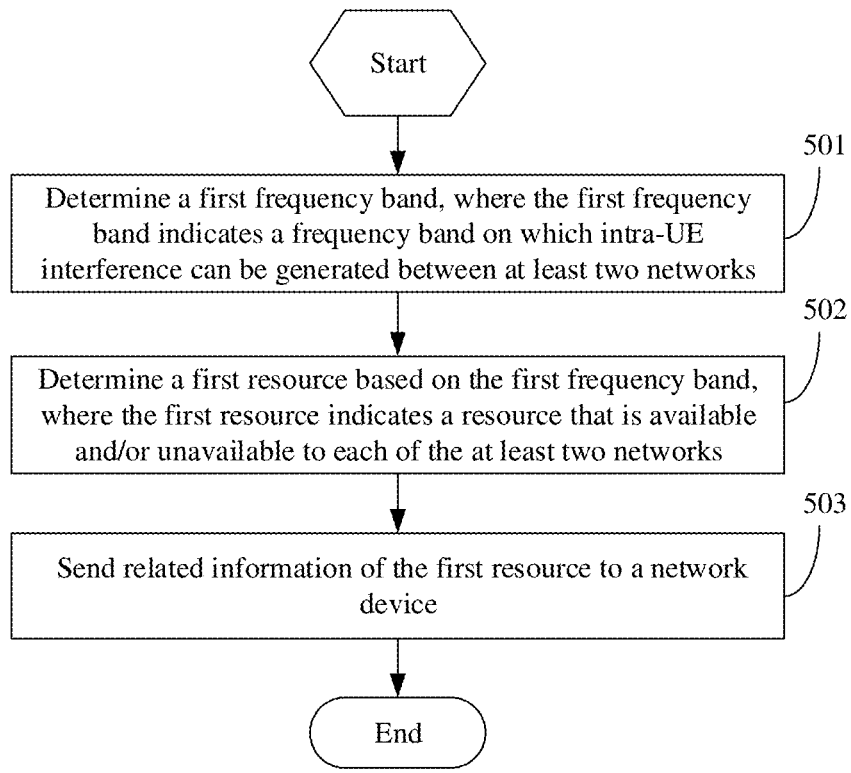
FIG. 5 is a flowchart 4 of a communication method according to an embodiment of the present disclosure.

As shown in FIG. 5, an embodiment of the present disclosure provides a communication method. The method is performed by a terminal device. For example, the terminal device is a multi-card multi-standby single-pass terminal or a multi-card multi-standby multi-pass terminal. Certainly, this is not limited. Specific steps are as follows:

Step 501: Determine a first frequency band, where the first frequency band indicates a frequency band on which intra-UE interference can be generated between at least two networks.

Different networks may include two or more networks. For example, different networks may include at least two of a 5G network of China Mobile, a 5G network of China Telecom, and a 5G network of China Unicom. Certainly, it can be understood that an operator and a network type are not specifically limited in this embodiment of the present disclosure.

Self-interference of the terminal device includes harmonic interference, intermodulation interference, and the like.

Step 502: Determine a first resource based on the first frequency band, where the first resource indicates a resource that is available and/or unavailable to each of the at least two networks.

The available resource can be understood as that a self-interference problem does not occur when the resource is used. The unavailable resource can be understood as that the self-interference problem occurs when the resource is used.

For example, the resource may include at least one of a time resource, a frequency resource, and a time-frequency domain resource.

Step 503: Send related information of the first resource to a network device.

Optionally, in step 503, the terminal device may send the related information of the first resource to one or more network devices.

For example, the terminal device sends related information of a first resource of the 5G network of China Mobile to a 5G base station of China Mobile; or the terminal device sends related information of a first resource of the 5G network of China Telecom to a 5G base station of China Mobile; or the terminal device sends related information of a first resource of the 5G network of China Mobile and related information of a first resource of the 5G network of China Telecom to a 5G base station of China Mobile.

The first resource includes at least one of the following: a resource that is not scheduled by one or more networks in uplink and/or downlink, a resource that is reserved by one or more networks in uplink and/or downlink, and a resource to be used by one or more networks in uplink and/or downlink.

In this embodiment of the present disclosure, optionally, the method further includes: receiving an acknowledgment (ACK) message or a negative acknowledgment (NACK) message of the related information of the first resource.

In this embodiment of the present disclosure, optionally, the method further includes: receiving related information of a second resource, where the second resource indicates a resource that is available and/or unavailable to one or more networks. It can be understood that the related information of the second resource may be different from the related information of the first resource.

In this embodiment of the present disclosure, a self-interference problem of the terminal device can be avoided in a multi-card multi-standby single-pass (even multi-card multi-standby multi-pass) scenario.

Figure 6:
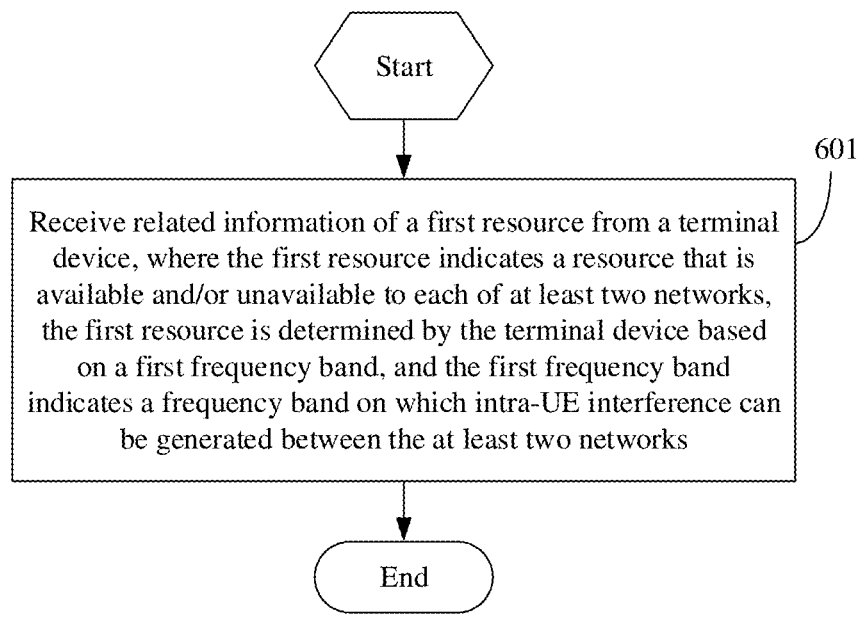
FIG. 6 is a flowchart 5 of a communication method according to an embodiment of the present disclosure.

As shown in FIG. 6, an embodiment of the present disclosure provides a communication method. The method is performed by a network device. Specific steps are as follows:

Step 601: Receive related information of a first resource from a terminal device, where the first resource indicates a resource that is available and/or unavailable to each of at least two networks, the first resource is determined by the terminal device based on a first frequency band, and the first frequency band indicates a frequency band on which intra-UE interference can be generated between the at least two networks. Self-interference of the terminal device includes harmonic interference, intermodulation interference, and the like.

The terminal device may be a multi-card multi-standby single-pass terminal or a multi-card multi-standby multi-pass terminal.

In this embodiment of the present disclosure, optionally, the method further includes: sending an ACK message or a NACK message of the related information of the first resource to the terminal device.

In this embodiment of the present disclosure, optionally, the method further includes: sending related information of a second resource to the terminal device, where the second resource indicates a resource that is available and/or unavailable to one or more networks. It can be understood that the related information of the second resource may be different from the related information of the first resource. In this embodiment of the present disclosure, optionally, the method further includes: performing uplink or downlink scheduling on the terminal device based on the first resource.

In this embodiment of the present disclosure, a self-interference problem of the terminal device can be avoided in a multi-card multi-standby single-pass (even multi-card multi-standby multi-pass) scenario.

Example 3

Compared with an EN-DC scenario, a self-interference problem of the terminal device in a multi-card multi-standby single-pass (even multi-card multi-standby multi-pass) scenario is more complex. The R15 standard has supported exchange of time-frequency domain information between an EN-DC gNB and an eNB to avoid self-interference.

Multi-card multi-standby single-pass (even multi-card multi-standby multi-pass) needs to be extended to information exchange between at least two systems. If it is difficult to exchange information in real time between operators of different subscriber identification cards (for example, SIM cards), related information may be transmitted by using the terminal device in this embodiment of the present disclosure as an intermediary.

In this example, (1) the terminal device determines a frequency band on which self-interference of the terminal device may be generated for multi-standby or multi-pass of multiple systems; (2) the terminal device determines a resource (for example, the resource includes at least one of a time resource, a frequency resource, and a time-frequency domain resource) available or unavailable to a related system based on the frequency band on which self-interference may be generated for multi-standby or multi-pass of the multiple systems; (3) the terminal device reports, to one or more base stations, an uplink (or a downlink) resource that is not scheduled or reserved or intended to be used and that belongs to the current system or does not belong to the current system, to avoid self-interference of the terminal device between the multiple systems; (4) after receiving the content reported by the terminal device, the base station feeds back an ACK/NACK, or sends the resource that is not scheduled or reserved or intended to be used (which may be different from the content reported by the terminal device) to the terminal device, or performs uplink and downlink scheduling based on the content reported by the terminal device.

In this example, a form of the resource includes at least one of the following:
(i) Time dimension: period, offset, and duration; or bit-map;
(ii) Frequency domain dimension: bandwidth (bend), component carrier (CC), bandwidth part (BWP), physical resource block (PRBPRB), and the like;
(iii) Time-frequency domain dimensions.

An embodiment of the present disclosure further provides a terminal device. Because a problem resolving principle of the terminal device is similar to that of the communication method in the embodiments of the present disclosure, for implementation of the terminal device, reference may be made to implementation of the method, and repeated parts are not described.

Figure 7:
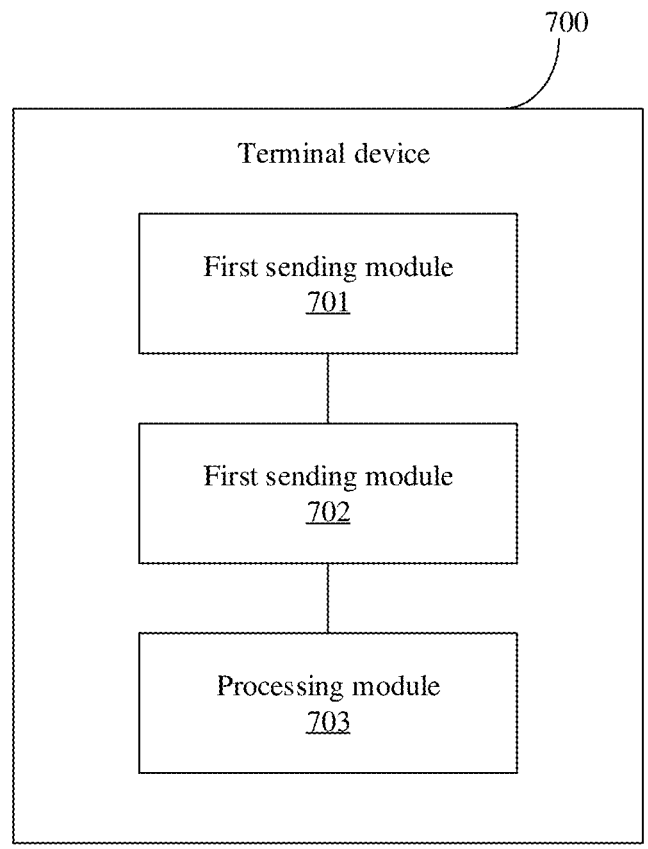
FIG. 7 is a structural diagram 1 of a terminal device according to an embodiment of the present disclosure.

As shown in FIG. 7, an embodiment of the present disclosure provides a terminal device. The terminal device 700 includes:

a first sending module 701, configured to send DRX-related information of a second network device to a first network device;

a first receiving module 702, configured to receive a time gap configured by the first network device, where the time gap is obtained by the first network device based on the DRX-related information of the second network device; and a processing module 703, configured to perform an operation for the second network device based on the time gap; where the first network device serves a first-type network of a first operator, and the second network device serves a first-type network of a second operator.

In this embodiment of the present disclosure, optionally, the first sending module is further configured to send the DRX-related information of the second network device to the first network device based on a preset time format, where the first network device supports the preset time format.

In this embodiment of the present disclosure, optionally, the DRX-related information is any one of the following: DRX-related information for an idle state, DRX-related information for an inactive state, and DRX-related information for a connected state.

In this embodiment of the present disclosure, optionally, content in the DRX-related information includes at least one of the following: a DRX period, an offset, and duration.

In this embodiment of the present disclosure, optionally, the terminal device further includes:

a second sending module, configured to send first information to the first network device, where the first information is used to indicate an application scenario or an application purpose of the time gap.

In this embodiment of the present disclosure, optionally, the time gap includes at least one of the following: a DRX period, a measurement gap, and a multicast broadcast single-frequency network MBSFN period.

In this embodiment of the present disclosure, optionally, a DRX period of the first network device is N times a DRX period of the second network device; or a measurement gap of the first network device is N times a DRX period of the second network device; or an MBSFN period of the first network device is N times a DRX period of the second network device; where N is greater than or equal to 1.

The terminal device provided in this embodiment of the present disclosure may execute the foregoing method embodiments, and implementation principles and technical effects thereof are similar. Details are not described herein again in this embodiment.

An embodiment of the present disclosure further provides a first network device. Because a problem resolving principle of the first network device is similar to that of the communication method in the embodiments of the present disclosure, for implementation of the first network device, reference may be made to implementation of the method, and repeated parts are not described.

Figure 8:
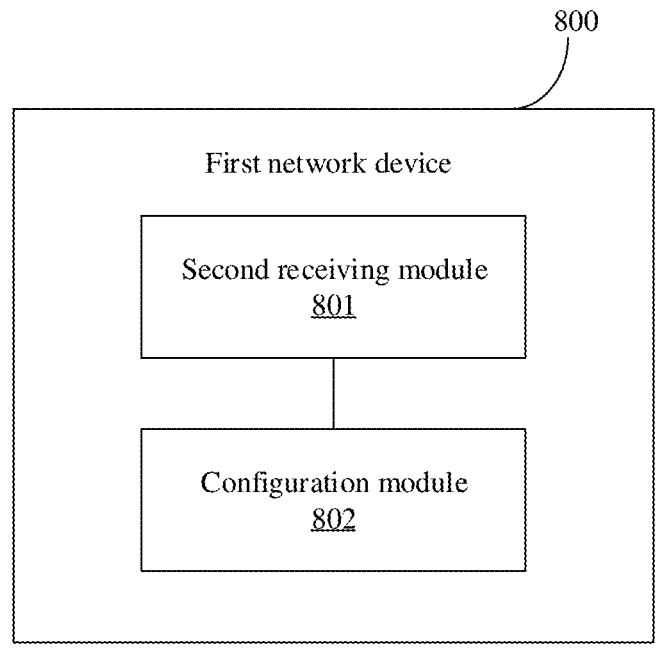
FIG. 8 is a structural diagram of a first network device according to an embodiment of the present disclosure.

As shown in FIG. 8, an embodiment of the present disclosure provides a first network device. The first network device 800 includes:

a second receiving module 801, configured to receive DRX-related information of a second network device from a terminal device; and a configuration module 802, configured to configure a time gap of the terminal device based on the DRX-related information of the second network device, where the time gap is used by the terminal device to perform an operation for the second network device; where the first network device serves a first-type network of a first operator, and the second network device serves a first-type network of a second operator.

In this embodiment of the present disclosure, optionally, the second receiving module is further configured to receive the DRX-related information of the second network device from the terminal device, where the DRX-related information of the second network device is a preset time format, and the first network device supports the preset time format.

In this embodiment of the present disclosure, optionally, the DRX-related information is any one of the following: DRX-related information for an idle state, DRX-related information for an inactive state, and DRX-related information for a connected state.

In this embodiment of the present disclosure, optionally, content in the DRX-related information includes at least one of the following: a DRX period, an offset, and duration.

In this embodiment of the present disclosure, optionally, the first network device further includes:

a third receiving module, configured to receive first information from the terminal device, where the first information is used to indicate an application scenario or an application purpose of the time gap.

In this embodiment of the present disclosure, optionally, the time gap includes at least one of the following: a DRX period, a measurement gap, and an MBSFN period.

In this embodiment of the present disclosure, optionally, a DRX period of the first network device is N times a DRX period of the second network device; or a measurement gap of the first network device is N times a DRX period of the second network device; or an MBSFN period of the first network device is N times a DRX period of the second network device; where N is greater than or equal to 1.

The first network device provided in this embodiment of the present disclosure may execute the foregoing method embodiments, and implementation principles and technical effects thereof are similar. Details are not described herein again in this embodiment.

An embodiment of the present disclosure further provides a terminal device. Because a problem resolving principle of the terminal device is similar to that of the communication method in the embodiments of the present disclosure, for implementation of the terminal device, reference may be made to implementation of the method, and repeated parts are not described.

Figure 9:
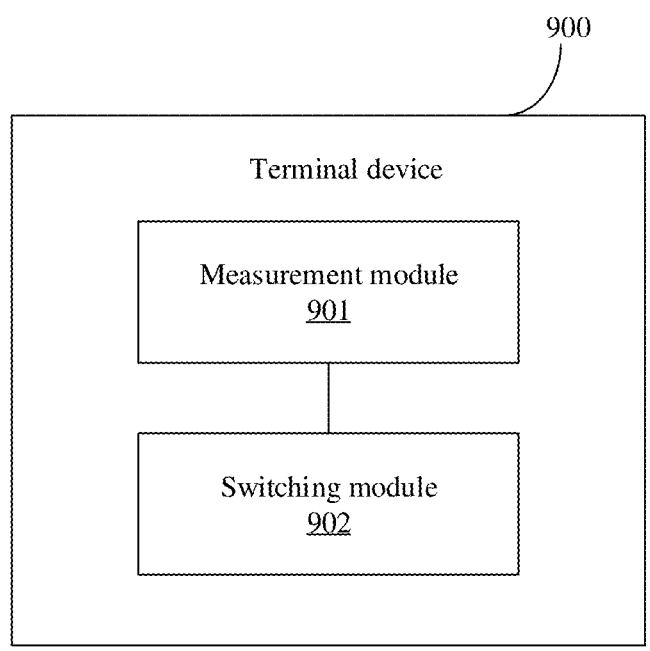
FIG. 9 is a structural diagram 2 of a terminal device according to an embodiment of the present disclosure.

As shown in FIG. 9, an embodiment of the present disclosure provides a terminal device. The terminal device 900 includes:

a measurement module 901, configured to measure a first-type network of a second operator when the terminal device works in a first-type network of a first operator, to obtain a measurement result; and a switching module 902, configured to switch from the first-type network of the first operator to the first-type network of the second operator when the measurement result meets a predetermined switching condition.

In this embodiment of the present disclosure, optionally, the terminal device further includes:

a prompt module, configured to: when the measurement result meets the predetermined switching condition, inform whether to switch from the first-type network of the first operator to the first-type network of the second operator.

In this embodiment of the present disclosure, optionally, the switching module is further configured to:

when signal quality of the first-type network of the second operator is greater than a first signal threshold, and/or when load of the first-type network of the second operator is less than a first load threshold, switch from the first-type network of the first operator to the first-type network of the second operator.

In this embodiment of the present disclosure, optionally, the measurement module is further configured to perform at least one of the following:

when the terminal device works in the first-type network of the first operator, and signal quality of the first-type network of the first operator is less than a second signal threshold, measuring the first-type network of the second operator, to obtain the measurement result; and when the terminal device works in the first-type network of the first operator, and load of the first-type network of the first operator is greater than a second load threshold, measuring the first-type network of the second operator, to obtain the measurement result.

In this embodiment of the present disclosure, optionally, the terminal device further includes:

a setting module, configured to predefine switching priorities of different types of networks of different operators.

The measurement module is further configured to measure the first-type network of the second operator based on the switching priority when the terminal device works in the first-type network of the first operator, to obtain a measurement result.

In this embodiment of the present disclosure, optionally, a switching priority of the first-type network of the second operator is higher than at least one of the following:

a switching priority of another type of network of the second operator; and a switching priority of a first-type network or another type of network of another operator.

The terminal device provided in this embodiment of the present disclosure may execute the foregoing method embodiments, and implementation principles and technical effects thereof are similar. Details are not described herein again in this embodiment.

An embodiment of the present disclosure further provides a terminal device. Because a problem resolving principle of the terminal device is similar to that of the communication method in the embodiments of the present disclosure, for implementation of the terminal device, reference may be made to implementation of the method, and repeated parts are not described.

Figure 10:
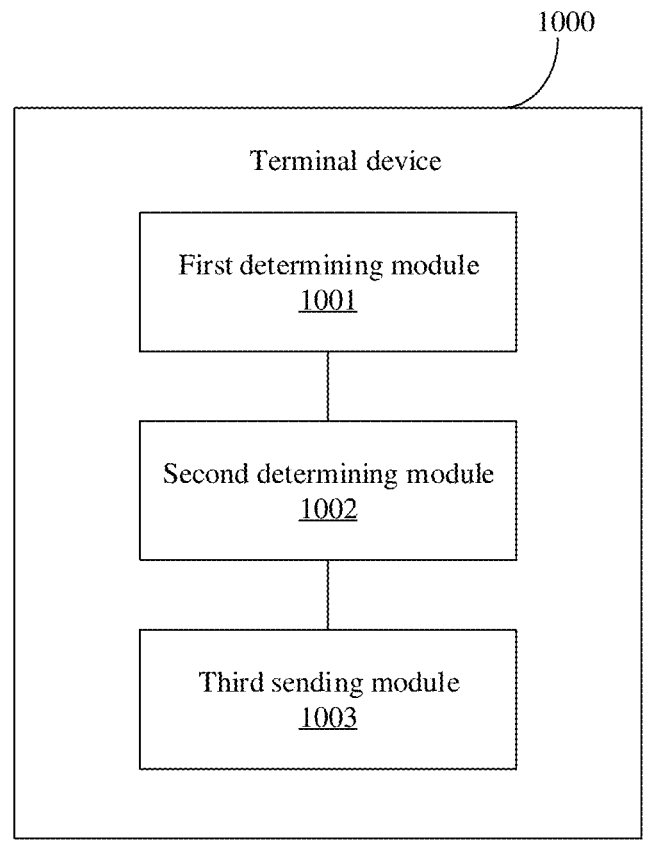
FIG. 10 is a structural diagram 3 of a terminal device according to an embodiment of the present disclosure.

As shown in FIG. 10, an embodiment of the present disclosure provides a terminal device. The terminal device 1000 includes:

a first determining module 1001, configured to determine a first frequency band, where the first frequency band indicates a frequency band on which intra-UE interference can be generated between at least two networks;

a second determining module 1002, configured to determine a first resource based on the first frequency band, where the first resource indicates a resource that is available and/or unavailable to each of the at least two networks; and a third sending module 1003, configured to send related information of the first resource to a network device.

In this embodiment of the present disclosure, optionally, the first resource includes at least one of the following:

a resource that is not scheduled by one or more networks in uplink and/or downlink;

a resource that is not reserved by one or more networks in uplink and/or downlink; and a resource to be used by one or more networks in uplink and/or downlink.

In this embodiment of the present disclosure, optionally, the terminal device further includes a fourth receiving module, configured to receive an ACK message or a NACK message of the related information of the first resource; or receive related information of a second resource, where the second resource indicates a resource that is available and/or unavailable to one or more networks.

In this embodiment of the present disclosure, optionally, the second resource includes at least one of the following:

a resource that is not scheduled by one or more networks in uplink and/or downlink;

a resource that is not reserved by one or more networks in uplink and/or downlink;

and a resource to be used by one or more networks in uplink and/or downlink.

The terminal device provided in this embodiment of the present disclosure may execute the foregoing method embodiments, and implementation principles and technical effects thereof are similar. Details are not described herein again in this embodiment.

An embodiment of the present disclosure further provides a network device. Because a problem resolving principle of the network device is similar to that of the communication method in the embodiments of the present disclosure, for implementation of the network device, reference may be made to implementation of the method, and repeated parts are not described.

Figure 11:
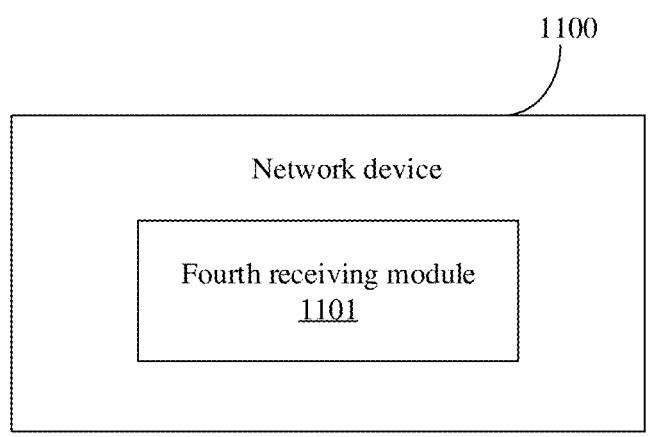
FIG. 11 is a structural diagram 1 of a network device according to an embodiment of the present disclosure.

As shown in FIG. 11, an embodiment of the present disclosure provides a network device. The network device 1100 includes:

a fourth receiving module 1101, configured to receive related information of a first resource from a terminal device, where the first resource indicates a resource that is available and/or unavailable to each of at least two networks, the first resource is determined by the terminal device based on a first frequency band, and the first frequency band indicates a frequency band on which intra-UE interference can be generated between the at least two networks.

In this embodiment of the present disclosure, optionally, the network device further includes:

a fourth sending module, configured to send an ACK message or a NACK message of the related information of the first resource to the terminal device.

In this embodiment of the present disclosure, optionally, the network device further includes:

a fifth sending module, configured to send related information of a second resource to the terminal device, where the second resource indicates a resource that is available and/or unavailable to one or more networks.

In this embodiment of the present disclosure, optionally, the network device further includes:

a scheduling module, configured to perform uplink and/or downlink scheduling on the terminal device based on the first resource.

The network device provided in this embodiment of the present disclosure may execute the foregoing method embodiments, and implementation principles and technical effects thereof are similar. Details are not described herein again in this embodiment.

Figure 12:
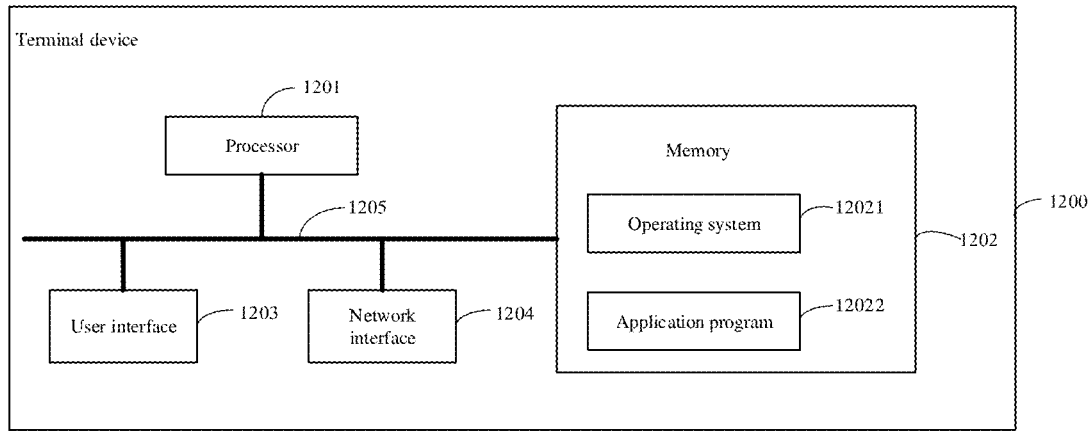
FIG. 12 is a structural diagram 4 of a terminal device according to an embodiment of the present disclosure.

As shown in FIG. 12, a terminal device 1200 shown in FIG. 12 includes at least one processor 1201, a memory 1202, at least one network interface 1204, and a user interface 1203. Various components of the terminal device 1200 are coupled by using the bus system 1205. It may be understood that the bus system 1205 is configured to implement a connection and communication between these components. In addition to a data bus, the bus system 1205 may include a power bus, a control bus, and a status signal bus. However, for clarity of description, various buses are marked as the bus system 1205 in FIG. 12.

The user interface 1203 may include a display, a keyboard, or a clicking device, for example, a mouse, a trackball, a touch panel, or a touchscreen.

It may be understood that the memory 1202 in this embodiment of the present disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (Erasable PROM, EPROM), an electrically erasable programmable read-only memory (Electrically EPROM, EEPROM), or a flash memory. The volatile memory may be a random access memory (RAM), and is used as an external cache. By way of example instead of limitation, many forms of RAM are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). The memory 1202 in the system and the method that are described in this embodiment of the present disclosure is to include but is not limited to these memories and a memory of any other proper type.

In some implementations, the memory 1202 stores the following element: an executable module or a data structure, a subset of an executable module or a data structure, or an extended set of an executable module or a data structure: an operating system 12021 and an application program 12022.

The operating system 12021 includes various system programs, for example, a framework layer, a kernel library layer, and a driver layer, and is configured to implement various basic services and process hardware-based tasks. The application program 12022 includes various application programs, for example, a media player and a browser, and is configured to implement various application services. A program for implementing the method in the embodiments of the present disclosure may be included in the application program 12022.

In an embodiment of the present disclosure, when a program or an instruction stored in the memory 1202 is invoked, specifically, when a program or an instruction stored in the application program 12022 is invoked, the following steps are implemented: sending discontinuous reception DRX-related information of a second network device to a first network device; receiving a time gap configured by the first network device, where the time gap is obtained by the first network device based on the DRX-related information of the second network device; and performing an operation for the second network device based on the time gap; where the first network device serves a first-type network of a first operator, and the second network device serves a first-type network of a second operator.

In another embodiment of the present disclosure, when a program or an instruction stored in the memory 1202 is invoked, specifically, when a program or an instruction stored in the application program 12022 is invoked, the following steps are implemented: measuring a first-type network of a second operator when the terminal device works in a first-type network of a first operator, to obtain a measurement result; and switching from the first-type network of the first operator to the first-type network of the second operator when the measurement result meets a predetermined switching condition.

In still another embodiment of the present disclosure, when a program or an instruction stored in the memory 1202 is invoked, specifically, when a program or an instruction stored in the application program 12022 is invoked, the following steps are implemented: determining a first frequency band, where the first frequency band indicates a frequency band on which intra-UE interference can be generated between at least two networks; determining a first resource based on the first frequency band, where the first resource indicates a resource that is available and/or unavailable to each of the at least two networks; and sending related information of the first resource to a network device.

The terminal device provided in this embodiment of the present disclosure may execute the foregoing method embodiments, and implementation principles and technical effects thereof are similar. Details are not described herein again in this embodiment.

Figure 13:
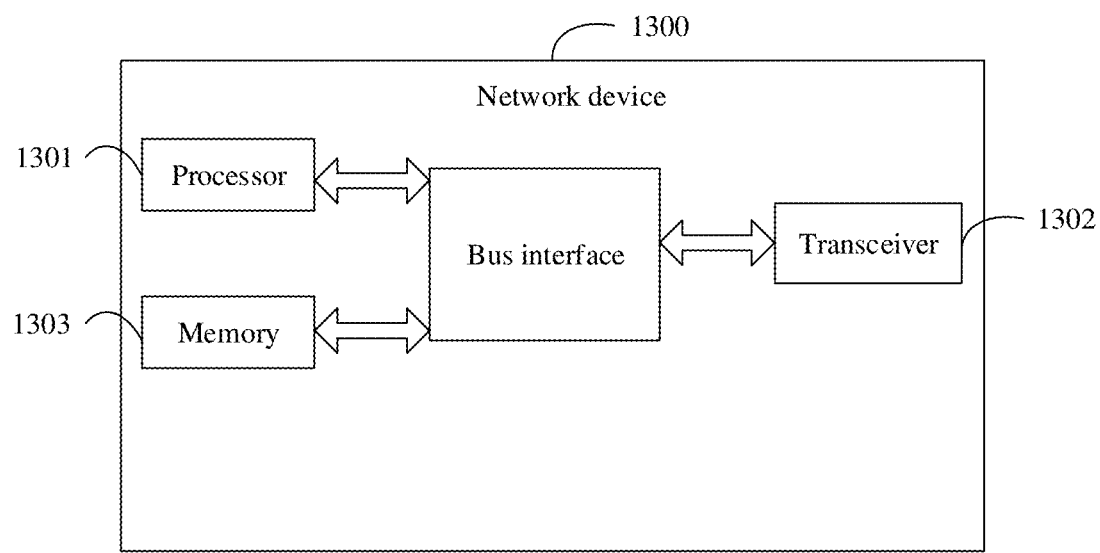
FIG. 13 is a structural diagram 2 of a network device according to an embodiment of the present disclosure.

FIG. 13 is a structural diagram of a network device applied to an embodiment of the present disclosure. As shown in FIG. 13, a network device 1300 includes a processor 1301, a transceiver 1302, a memory 1303, and a bus interface.

In an embodiment of the present disclosure, the network device 1300 further includes a computer program that is stored in the memory 1303 and that can run on the processor 1301. When the computer program is executed by the processor 1301, the following steps are implemented: receiving DRX-related information of a second network device from a terminal device; and configuring a time gap of the terminal device based on the DRX-related information of the second network device, where the time gap is used by the terminal device to perform an operation for the second network device; where the first network device serves a first-type network of a first operator, and the second network device serves a first-type network of a second operator.

In another embodiment of the present disclosure, the network device 1300 further includes a computer program that is stored in the memory 1303 and that can run on the processor 1301. When the computer program is executed by the processor 1301, the following steps are implemented: receiving related information of a first resource from a terminal device, where the first resource indicates a resource that is available and/or unavailable to each of at least two networks, the first resource is determined by the terminal device based on a first frequency band, and the first frequency band indicates a frequency band on which intra-UE interference can be generated between the at least two networks.

In FIG. 13, a bus architecture may include any quantity of interconnected buses and bridges, and is specifically linked by various circuits of one or more processors represented by the processor 1301 and a memory represented by the memory 1303. The bus architecture may further connect together various other circuits of a peripheral device, a voltage stabilizer, a power management circuit, and the like, which are known in this art and will not be further described herein. The bus interface provides an interface. The transceiver 1302 may include a plurality of elements, that is, include a transmitter and a receiver, and provide units for communication with various other apparatuses on a transmission medium.

The processor 1301 is responsible for managing the bus architecture and common processing, and the memory 1303 may store data used when the processor 1301 performs an operation.

The network device provided in this embodiment of the present disclosure may execute the foregoing method embodiments, and implementation principles and technical effects thereof are similar. Details are not described herein again in this embodiment.

Method or algorithm steps described in combination with the content disclosed in the present disclosure may be implemented by hardware, or may be implemented by a processor by executing a software instruction. The software instruction may be formed by a corresponding software module. The software module may be stored in a RAM, a flash memory, a ROM, an EPROM, an EEPROM, a register, a hard disk, a removable hard disk, a read-only compact disc, or a storage medium of any other form known in the art. For example, a storage medium is coupled to the processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in the present disclosure may be implemented by hardware, software, firmware, or any combination thereof. When implemented by software, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of the present disclosure are further described in detail in the foregoing specific implementations. It should be understood that the foregoing descriptions are merely specific implementations of the present disclosure, and are not intended to limit the protection scope of the present disclosure. Any modification, equivalent replacement, or improvement made on the basis of the technical solutions of the present disclosure shall fall within the protection scope of the present disclosure.

A person skilled in the art should understand that the embodiments of the present disclosure may be provided as a method, a system, or a computer program product. Therefore, the embodiments of the present disclosure may use a form of hardware only embodiments, software only embodiments, or embodiments with a combination of software and hardware. Moreover, the embodiments of the present disclosure may use a form of a computer program product that is implemented on one or more computer-usable storage media (including but not limited to a magnetic disk memory, a CD-ROM, an optical memory, and the like) that include computer-usable program code.

The embodiments of the present disclosure are described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided to a processor of a general-purpose computer, a dedicated computer, an embedded processor, or another programmable data processing device to produce a machine, so that instructions executed by a processor of a computer or another programmable data processing device produce an apparatus for implementing a function specified in one or more processes of the flowchart and/or one or more blocks of the block diagram.

These computer program instructions may also be stored in a computer-readable memory that can instruct a computer or another programmable data processing device to work in a specific manner, so that an instruction stored in the computer-readable memory generates a product including an instruction apparatus, and the instruction apparatus implements a function specified in one or more processes of the flowchart and/or one or more blocks of the block diagram.

These computer program instructions may also be loaded onto a computer or another programmable data processing device, so that a series of operation steps are performed on the computer or the another programmable device to produce computer-implemented processing, thereby providing instructions executed on the computer or the another programmable device to implement the function specified in one or more processes of the flowchart and/or one or more blocks of the block diagram.

It can be understood that the embodiments described in the embodiments of the present disclosure may be implemented by hardware, software, firmware, middleware, microcode, or a combination thereof. For hardware implementation, the processing unit may be implemented in one or more application specific integrated circuits (ASIC), a digital signal processor (DSP), a digital signal processing device (DSP Device, DSPD), a programmable logic device (PLD), a field-programmable gate array (FPGA), a general-purpose processor, a controller, a microcontroller, a microprocessor, another electronic unit configured to perform the functions described in the present disclosure, or a combination thereof.

For software implementation, the techniques described in the embodiments of the present disclosure may be implemented by modules (for example, processes or functions) that perform the functions described in the embodiments of the present disclosure. Software codes can be stored in the memory and executed by the processor. The memory can be implemented inside or outside the processor.

Obviously, a person skilled in the art can make various modifications and variations to the embodiments of the present disclosure without departing from the spirit and scope of the present disclosure. In this way, the present disclosure is intended to include these modifications and variations of the embodiments of the present disclosure provided that they fall within the scope of the claims of the present disclosure and their equivalent technologies.

The invention claimed is:

1. A communication method, applied to a terminal device, wherein the method comprises:
   measuring a first-type network of a second operator when the terminal device works in a first-type network of a first operator, to obtain a measurement result; and
   switching from the first-type network of the first operator to the first-type network of the second operator when the measurement result meets a predetermined switching condition;
   wherein the measuring a first-type network of a second operator when the terminal device works in a first-type network of a first operator, to obtain a measurement result comprises:
      when the terminal device works in the first-type network of the first operator, and load of the first-type network of the first operator is greater than a load threshold, measuring the first-type network of the second operator, to obtain the measurement result;
   wherein before the switching from the first-type network of the first operator to the first-type network of the second operator, the method further comprises:
      when the measurement result meets the predetermined switching condition, informing a user of the terminal device whether to switch from the first-type network of the first operator to the first-type network of the second operator.

2. The method according to claim 1, wherein the switching from the first-type network of the first operator to the first-type network of the second operator when the measurement result meets a predetermined switching condition comprises:
   when load of the first-type network of the second operator is less than another load threshold, switching from the first-type network of the first operator to the first-type network of the second operator.

3. The method according to claim 1, further comprising:
   predefining switching priorities of different types of networks of different operators; and
   the measuring a first-type network of a second operator when the terminal device works in a first-type network of a first operator, to obtain the measurement result comprises:
   measuring the first-type network of the second operator based on the switching priority when the terminal device works in the first-type network of the first operator, to obtain the measurement result.

4. The method according to claim 3, wherein the switching priority of the first-type network of the second operator is higher than at least one of the following:
   a switching priority of another type of network of the second operator; and
   a switching priority of a second-type network or another type of network of another operator.

5. A terminal device, comprising: a processor, a memory, and a program that is stored in the memory and that can run on the processor, wherein the program is executed by the processor to perform steps of:
   measuring a first-type network of a second operator when the terminal device works in a first-type network of a first operator, to obtain a measurement result; and switching from the first-type network of the first operator to the first-type network of the second operator when the measurement result meets a predetermined switching condition;

wherein when measuring a first-type network of a second operator when the terminal device works in a first-type network of a first operator, to obtain a measurement result, the program is executed by the processor to perform:

when the terminal device works in the first-type network of the first operator, and load of the first-type network of the first operator is greater than a load threshold, measuring the first-type network of the second operator, to obtain the measurement result;

wherein before the switching from the first-type network of the first operator to the first-type network of the second operator, the program is executed by the processor to perform the steps of:

when the measurement result meets the predetermined switching condition, informing a user of the terminal device whether to switch from the first-type network of the first operator to the first-type network of the second operator.

6. The terminal device according to claim 5, wherein when switching from the first-type network of the first operator to the first-type network of the second operator when the measurement result meets a predetermined switching condition, the program is executed by the processor to perform steps of:

when load of the first-type network of the second operator is less than a another load threshold, switching from the first-type network of the first operator to the first-type network of the second operator.

7. The terminal device according to claim 5, wherein the program is executed by the processor to perform steps of: predefining switching priorities of different types of networks of different operators; and when measuring a first-type network of a second operator when the terminal device works in a first-type network of a first operator, to obtain the measurement result, the program is executed by the processor to perform steps of:

measuring the first-type network of the second operator based on the switching priority when the terminal device works in the first-type network of the first operator, to obtain the measurement result.

8. The terminal device according to claim 7, wherein the switching priority of the first-type network of the second operator is higher than at least one of the following:

a switching priority of another type of network of the second operator; and a switching priority of a second-type network or another type of network of another operator.

9. A communication method, applied to a terminal device, wherein the method comprises:

measuring a first-type network of a second operator when the terminal device works in a first-type network of a first operator, to obtain a measurement result; and switching from the first-type network of the first operator to the first-type network of the second operator when the measurement result meets a predetermined switching condition;

wherein the measuring a first-type network of a second operator when the terminal device works in a first-type network of a first operator, to obtain a measurement result comprises at least one of the following:

when the terminal device works in the first-type network of the first operator, triggering measurement of the first-type network of the second operator by a triggering condition that signal quality of the first-type network of the first operator is less than a second signal threshold, to obtain the measurement result; and when the terminal device works in the first-type network of the first operator, triggering measurement of the first-type network of the second operator by a triggering condition that load of the first-type network of the first operator is greater than a load threshold, to obtain the measurement result;

wherein before the switching from the first-type network of the first operator to the first-type network of the second operator, the method further comprises:

when the measurement result meets the predetermined switching condition, informing a user of the terminal device whether to switch from the first-type network of the first operator to the first-type network of the second operator.

10. The method according to claim 9, wherein the switching from the first-type network of the first operator to the first-type network of the second operator when the measurement result meets a predetermined switching condition comprises:

when signal quality of the first-type network of the second operator is greater than a another signal threshold, and/or when load of the first-type network of the second operator is less than another load threshold, switching from the first-type network of the first operator to the first-type network of the second operator.

11. The method according to claim 9, further comprising: predefining switching priorities of different types of networks of different operators; and the measuring a first-type network of a second operator when the terminal device works in a first-type network of a first operator, to obtain the measurement result comprises:

measuring the first-type network of the second operator based on the switching priority when the terminal device works in the first-type network of the first operator, to obtain the measurement result.

12. The method according to claim 11, wherein the switching priority of the first-type network of the second operator is higher than at least one of the following:

a switching priority of another type of network of the second operator; and a switching priority of a second-type network or another type of network of another operator.

* * * * *